Sept. 11, 1923.
L. C. BLUNT
PROCESS FOR MAKING CANDY
Filed July 2, 1921
1,467,351
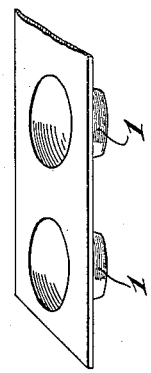
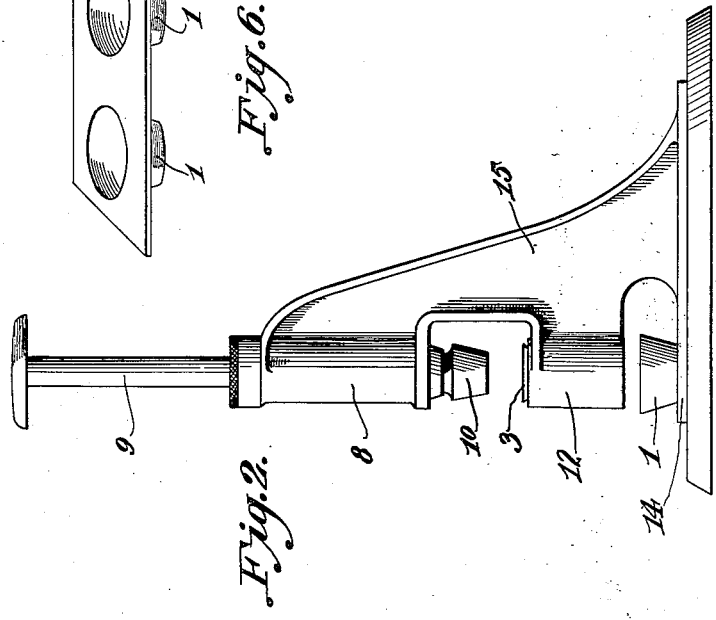
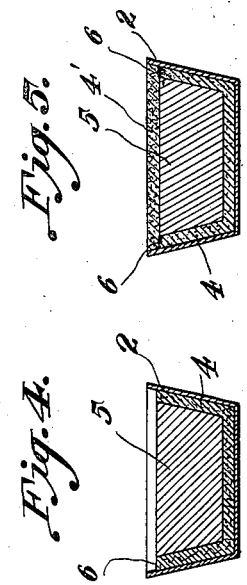
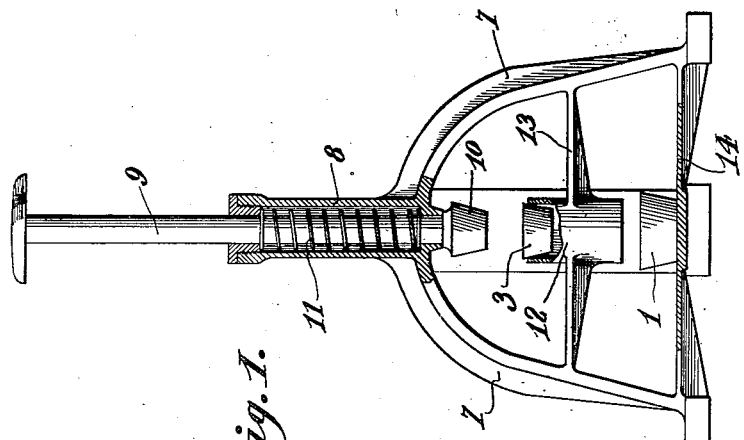
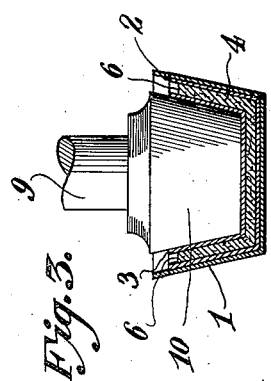
Lawrence C. Blunt
INVENTOR.
BY
Mason, Fenwick & Lawrence
ATTORNEYS.

Patented Sept. 11, 1923.

1,467,351

UNITED STATES PATENT OFFICE.

LAWRENCE C. BLUNT, OF DENVER, COLORADO.

PROCESS FOR MAKING CANDY.

Application filed July 2, 1921. Serial No. 482,181.

*To all whom it may concern:*

Be it known that I, LAWRENCE C. BLUNT, a citizen of the United States, residing at Denver, in the county of Denver and State of Colorado, have invented certain new and useful Improvements in Processes for Making Candy; and I do hereby declare the following to be a full, clear, and exact description of the invention, such as will enable others skilled in the art to which it appertains to make and use the same.

This invention relates to an improved process and apparatus for the making of filled candies.

The primary object of the invention is to provide a new process and apparatus by means of which filled candies may be manufactured rapidly, economically and with uniformity and whereby the candies thus manufactured will contain the filler confection hermetically sealed within the container confection. Additionally, it is an object of this invention to provide means for the making of coated or covered confections without the necessity for the filler or coating to be manipulated by the hands, and to provide a confection which may be dispensed or sold in the mold employed in its manufacture.

The invention consists in the novel steps, processes, and mechanical means hereinafter more fully described and claimed.

One sheet of drawings accompanies this specification as part thereof, in which like reference characters indicate similar parts throughout.

Figure 1 is a vertical view partly in section of one form of device for carrying into effect my improved process;

Fig. 2 is a side elevation of a modified form of my improved apparatus;

Fig. 3 is a vertical view partly in section showing the formation of the confection container;

Fig. 4 is a vertical sectional view showing the confection container with the confection filler;

Fig. 5 is a vertical sectional view showing the confection container complete with the top in position and the confection filler hermetically sealed therein, and Fig. 6 is a perspective view partly broken away of a strip of dies.

In accordance with my invention, die cup parts 1 of suitable non-flexible material which may be made singly as illustrated in Figs. 1 and 2 or in multiple groups, as illustrated in Fig. 6, are provided, within which a protective cup 2 of non-adhesive material, such as paraffined paper or the like, is placed. Chocolate or other suitable candy material in a heated and plastic condition is then punched out or poured into cup 2 in the required quantity and a second die 10 of similar shape but smaller dimensions carrying a second and smaller cup 3 of rubber, paraffined paper or other suitable material, is forced down within the first die member, compressing and spreading the confection 4 into the shape of a cup between the cups 2 and 3, as illustrated in Fig. 3. While the die 10 is maintained in its downmost position, the die cup 1 is tapped by hand or shaken by suitable mechanism, (not shown but common to the art) to level the plastic candy material. Die 10 is then elevated and the die cup 1 and its contents are cooled to harden the candy material. Although it is permissible to remove the confection cup 4 from die cup 1 at this stage, the preferred method is to permit it to remain in die cup 1, until the candy piece or confection is completed. The inner cup 3 is removed after the confection cup 4 has cooled and hardened and a filler or center 5, which may be hot or cold, liquid, semi-solid, or solid, is poured or dropped into the confection cup 4. The upper portion of the latter is then re-heated, or if preferred the whole cup 4 may be re-heated until its upper edge becomes soft or plastic, when a covering or topping 4' is dropped or punched out upon the filler. Die cup 1 is again tapped or shaken to level the topping 4' which fuses with the upper portion of the confection cup 4 to form a homogeneous joint therewith.

If desired, the top 4' may be previously molded and pre-heated and then joined with the confection cup 4.

Modifications in the shape and form of the die parts will readily suggest themselves to those skilled in the art.

For the rapid and efficient execution of above process, I provide an apparatus as illustrated in Figs. 1 and 2 which comprises a table 14 upon which the die members 1 are supported and movable and from which rise legs 7 as illustrated in Fig. 1 or a pedestal 15 as illustrated in Fig. 2 supporting a vertically positioned open-ended tubular member 12 having an inner diameter slightly less than the maximum diameter of the inner paraffined paper cup 3. Above the cylindrical member 12 is vertically and slidably supported the die member 10 carried by a rod 9 in a suitable guide part 8, the rod 9 being normally maintained in an elevated position by means of a spiral spring 11 within the guide 8.

In operation, the die cup 1 with the outer paraffined paper cup in position and the plastic candy coating material therein is placed upon table 14 under tubular member 12 and the inner paraffined paper cup 3 is placed within the upper end of the said tubular member. The rod 9 is then depressed forcing die part 10 into cup 3, both the die and the cup 3 passing through the tubular member and thence into die part 1 so that the cup 3 is positioned upon die 10 upon entering die 1. Upon the release of rod 9, die 10 is again raised to its elevated position after die 1 is shaken upon table 14 to level the candy cup 4 as previously pointed out. A new die 1 is then placed under tubular member 12 and the process is repeated.

It will be noted that there is no possibility of the plastic candy adhering to either of the die parts 1 or 10 and the process can be repeated with great rapidity by the use of a limited number of die parts 1.

The completed confection may be removed from the cup 2 when completed, but this is neither necessary nor desirable, for cup 2 provides a packing and protective cover for the confection and does away with the necessity for wrapping or packing of the candy piece prior to boxing for sale. It will be noted that the entire process may be accomplished without the candy maker being required to use his fingers at any stage of the process upon the candy material or filler.

Having thus fully described my invention, I claim:

1. The method of making confection shells from heat-plastic material, consisting in placing the material in a plastic condition into a mould having a removable lining, shaping the shells by pressing a deformable cup into the plastic mass and cooling the shell with the deformable cup located in the shell.

2. The method of making confection shells from heat-plastic material, consisting in placing the material in a plastic condition into a mould having a lining of waxed paper, shaping the shell by pressing a flexible cup into the plastic mass and cooling the shell with the deformable cup located in the shell.

3. The method of making confection shells from plastic material, consisting in placing the material in a plastic condition into a mould having a removable lining, shaping the shell by pressing a paper cup into the plastic mass and cooling the shell with the deformable cup located in the shell.

4. The method of making filled candy consisting in placing heat-plastic material in a plastic condition into a mould having a flexible lining, pressing a deformable cup into the plastic mass to form a shell, cooling the shell with the deformable cup located in the shell, removing the cup from the formed shell, depositing a center in the shell, and finally sealing the top of the shell.

5. The method of making filled candy consisting of pressing heat-plastic confection in a plastic condition between protective cups to form shells, cooling the shells so formed, removing the inner cup, filling the shell with a center, and finally sealing the shell with heat-plastic material.

In testimony whereof I affix my signature.

LAWRENCE C. BLUNT.